Aug. 11, 1964     L. JEAN-MARIE B. DUMAS     3,143,861

SYSTEM FOR PIPING FLUIDS ACROSS A BODY OF WATER

Filed July 10, 1961

INVENTOR

LUCIEN JEAN-MARIE BAPTISTE DUMAS

BY

Bacon & Thomas

ATTORNEYS

United States Patent Office 3,143,861
Patented Aug. 11, 1964

3,143,861
SYSTEM FOR PIPING FLUIDS ACROSS
A BODY OF WATER
Lucien Jean-Marie Baptiste Dumas, Paris, France, assignor to Geopetrole, Société Géotechnique pour la Production du Pétrole, Paris, France, a French society
Filed July 10, 1961, Ser. No. 123,402
Claims priority, application France July 12, 1960
2 Claims. (Cl. 61—42)

This invention relates to the piping of fluids, such as oil, natural gas, and the like, across large bodies of water such as oceans and seas. Heretofore the conduits containing the fluid to be piped were generally simply laid along the bottom of the body of water to be crossed.

With the great development, in recent years, of long-distance pipeline networks consequent on the ever-increasing demand on power throughout the world and the concurrent discovery of new sources of mineral energy media including both oil and natural gas, problems have now arisen in connection with the conveying of such fluids across large bodies of water which had gone more or less unnoticed before. A major one of these problems is the grave hazard incurred to the piping from underwater earthquakes, volcanoes, and similar geological disturbances. Present-day piping, once laid upon the sea-bed, is in effect rigidly bonded to the underlying ground and is hence highly vulnerable to such disturbances. Vertical breaks, faults, etc., in addition to less dangerous vibrations, and especially landslips frequently set off by sub-aquatic tremors, are causes of damage and destruction to such piping, with obviously serious economic consequences. It should be recalled that a sea-bed is hardly ever flat. The fine alluvial silt deposited on the sloping areas is especially sensitive to every movement and tremor of the earth's crust and responds by creating veritable landslides of great destructive force. These phenomena are especially frequent at and near the continental shelf as confirmed in recent years after the earthquakes off the coasts of Orleansville (Algeria) and Newfoundland, where telegraph cable (structures considerably stronger than pipelines) were found to have been ripped apart over vast expanses of the sea-bed.

It will readily be understood that the damaging consequences of such geological disturbances to under-water piping are multiplied many times in proportion to the depth at which the piping is laid, in view of the increase in hydrostatic pressure involved. Thus, where piping is laid across an ocean bed at one or more thousand feet depth, the piping is extremely vulnerable in geographic areas exposed to frequent or occasional earthquakes.

It is an object of this invention to provide a novel system for piping fluids across an expanse of water, which will be many times safer and less susceptible to damage from geological and analogous causes, than the systems in present use. An object is to provide a new and improved underwater pipeline structure. An object is to provide a compliant, floating type of support for transoceanic pipelines and the like. A further object is to provide such a system which will be relatively easy and economical to construct and to maintain. An object is to provide means whereby transoceanic conduits can be periodically serviced for maintenance, including both inspection and repair.

In accordance with an aspect of the invention, a tunnel is bored through the sea-bed at a level substantially below the bottom of the sea. The conduit through which fluid is to be piped is extended through this tunnel, being preferably supported through resilient means is spaced relation to the walls of the tunnel; and hydraulic communication is established from the sea to the interior of the tunnel around the conduit, so that the conduit is exposed to hydrostatic pressure from all sides, and is supported in substantially neutral equilibrium within the water-filled tunnel.

A better understanding of the invention will be had from the ensuing description made with reference to the accompanying schematic drawings, which illustrate some exemplary, non-restrictive forms of embodiment thereof.

Figure 1:
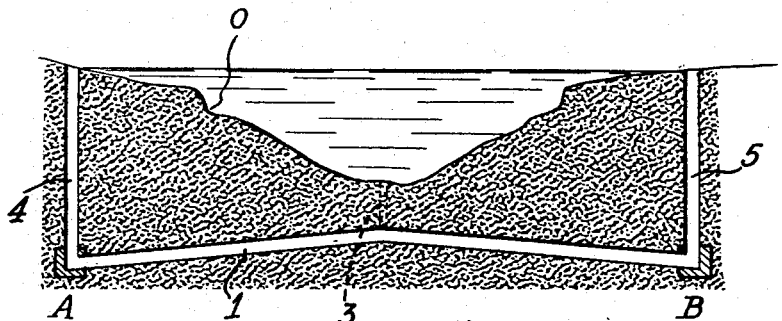
FIG. 1 is a vertical section, not drawn to scale, illustrating in highly diagrammatic form a transoceanic pipeline system according to the invention.

Referring to FIG. 1, an expanse of sea is summarily shown (with the continental shelf located at 0), and across which a pipeline is to be extended. In accordance with the invention, a tunnel 1 is bored a substantial depth below the ocean bottom, say 500, 1000 feet or more below the bottom. For this purpose the two end shafts 4 and 5 are shown, and it will be understood that these would, in practice, be provided with conventional pit equipment including shafthead frame, pit cage and hoisting means, top and bottom landing equipment, as well as pumping means. The tunnel 1 is bored between the bottom landings A and B of the shafts 4 and 5 using conventional tunnelling techniques.

Figure 2:
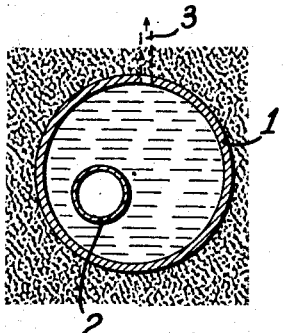
FIGS. 2, 3, 4 and 5 are larger scale cross-sectional views illustrating various embodiments.

A pipeline 2 through which fluid, say natural gas, is to be piped, is passed vertically through the shafts 4 and 5 and therebetween is extended through the tunnel 1. As shown e.g. in FIG. 2, the annular space between the conduit 2 and tunnel 1 is filled with water at the natural hydrostatic pressure. For this purpose, one or more intermediate shafts such as 3 may be drilled from the seabed to corresponding openings provided in the tunnel 1 (as shown in FIG. 2), and such shaft 3 may be cased according to conventional procedure. Alternatively, intermediate shafts such as 3 may be dispensed with, and the hydraulic communication between the interior of the tunnel 1 and the body of water may be provided through the shafts 4 and 5. It should be noted that while the shafts 4 and 5 have been shown as being drilled beyond the extreme ends of the body of water in FIG. 1, this is not essential.

Figure 3:
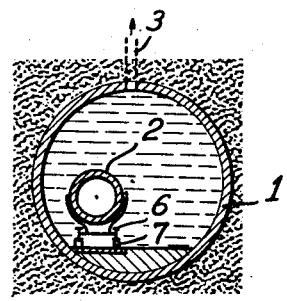

As shown in FIG. 2, the conduit 2 may be arranged to float more or less freely in the water-filled tunnel 1 throughout all or most of its length. Alternatively or in addition, the conduit may (as shown in FIG. 3) be supported at space points of its length on trolleys 6 mounted on tracks 7 extending over a flat concrete surface provided along the bottom of the tunnel, thereby facilitating longitudinal displacements of the conduit relatively to the tunnel in case of seismic disturbance.

Figure 4:
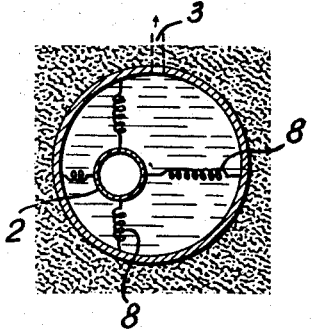

In FIG. 4 resilient connecting means, schematically indicated by tension coil springs 8, are shown connecting the conduit 2 to the walls of the tunnel. It will be apparent that the above described means may be combined in various ways. Thus the trucks 6 of FIG. 3 may have resilient means connecting them with the tunnel walls to provided limited compliance in transverse motion relative to the tunnel walls. As a further desirable possibility, the conduits 2 in FIG. 3 may be resiliently connected with their supporting trucks or trolleys. Conveniently, means are provided for permitting limited transverse displacement, as through rollers, between the conduits and trucks, as well as vertical guiding means permitting limited up-and-down movement of the conduit with respect to said trucks while ensuring that the conduit will drop back to a proper centered position on the trucks.

Pumping means preferably provided, permanently in the pits 4 and 5 as mentioned above, make it possible to exhaust the tunnel dry when required for inspection purposes and for any repairs that may be necessary from time to time to the conduits, conduit supporting means, and tunnel walls. In the empty condition of the tunnel, protection against seismic damage, while still present to some degree, is less reliable, so that such periods of inspection and servicing should be held to the minimum requisite duration.

Figure 5:
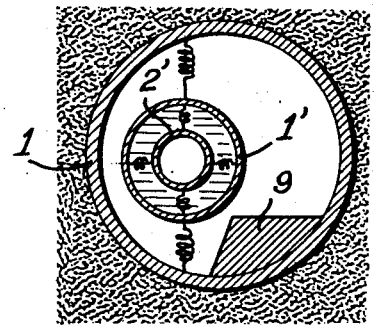

In a modified form of the invention shown in FIG. 5, the fluid conduit 2' is disposed within a larger-diameter outer conduit 1', which in turn is supported resiliently from the walls of the tunnel 1 by any of the means mentioned above in connection with the direct support of the conduit 2 from the tunnel 1, such means being schematically indicated in FIG. 5 in the form of springs. In this modification it is the annular space between the fluid-conduit 2' and the outer conduit 1' which is filled with water at the natural hydrostatic pressure by suitable connection (not shown) wtih the body of water, while the tunnel 1 around outer conduit 1' is empty of water. The last described embodiment, while somewhat more elaborate and expensive than the first embodiments described, has an advantage in that it enables permanent inspection throughout the tunnel, for which purpose a concrete track or gangway 9 is shown extending along a side of the tunnel.

Among the advantageous features of the system of the invention, of primary importance are those that are a direct result of the "hydrostatic coupling" provided between the tunnel (or outer conduit) and the body of water by providing flow communication therebetween as described above. Owing to this hydrostatic coupling, the tunnel walls which are rigidly bonded to the surrounding strata are able to assume any displacements whatever relatively to the conduit therein on movement of said strata, without imposing any stresses or strains upon the fluid-conduit floating therein.

Further, owing to the hydrostatic coupling referred to, the tunnel walls are not, in normal periods, exposed to any stress since the pressures on the inner and outer surfaces of them are the same. Hence the tunnel requires practically no maintenance at all. On occurrence of an earthquake or the like of moderate strength, the tunnel walls are able to comply elastically to the movements of the surrounding strata, whereas it is obvious that if the tunnel were empty, even moderate thrusting forces from the ground would be likely to damage the walls. In the case of an especially powerful quake resulting in a local dislocation of the wall of the tunnel, such damage will not be transmitted to the conduit within, which will continue to function as before, and ample time is available for thereafter repairing any damage sustained by the tunnel walls. Such repairs are, in fact, preferably initiated a considerable time, say months, after the accident, so that the ground has been able to settle and any faults created therein by the quake to fill in. At such time the tunnel can be exhausted with the pumps, and the necessary repairs carried out.

Due to the floating condition of the conduit within the tunnel (or within the outer conduit in FIG. 5), its apparent weight is reduced, and, above all, it is made independent in its motions, to a substantial degree, from the motions of the tunnel walls and the surrounding ground.

It is important to note that the weight and size of the conduit and the fluid therein should be so predetermined that its apparent weight (due to Archimedean lift) will not be so great as to thrust the conduit up against the roof of the tunnel, but rather the weigh and size thereof should be such as to tend to cause the fluid-filled conduit to float in substantially neutral equilibrium within the tunnel (or outer conduit). Simple calculation shows that this conduit is readily achieved with available conduit sizes. Thus, for the piping of natural gas, an "Extra-Strong Pipe, API," one half-inch wall thickness and 12 inches nominal diameter is quite suitable for use where the body of water involved is of normal, average salinity.

It may be further be noted that with the conduit immersed in neutral equilibrium in a medium under hydrostatic pressure as is the case in the system of the invention, the conduit wall is under permanent radial inward compression stress by said hydrostatic pressure, so that the structural characteristics of the wall material are greatly increased Hence, higher internal fluid pressures can be used than have been heretofore acceptable, thus making it possible to increase the amount of fluid piped through a conduit of given size.

At the same time, it will be evident that the conduits constructed and arranged according to the invention are completely protected from the class of hazards that are due to surface disturbances upon the ocean bed, as earlier mentioned.

For all the above reasons it will be clear that the various objects of the invention are achieved. Analysis of the economy factors involved shows that the increased initial outlay required by the structure of the invention as compared to conventional procedure is rapidly offset, in earthquake-prone areas of the globe, by the increased lifetime of the improved structure and the averted loss of large amounts of valuable fluid that can be anticipated.

What I claim is:

1. A structure for passing a conduit across a body of water, comprising: a tunnel, of greater diameter than said conduit, extending through the earth substantially below the bottom of said body of water, said conduit extending through the tunnel and being spaced from the walls thereof and supported therein for free transverse movement in said tunnel; and an open passageway connecting the interior of the tunnel with the body of water to fill said tunnel with water and establish natural hydrostatic pressure in the tunnel around the conduit; said conduit being closed against fluid communication between the water in said tunnel and the inside of said conduit.

2. A structure for passing a conduit across a body of water, comprising: a tunnel, of greater diameter than said conduit, extending through the earth substantially below the bottom of said body of water, said conduit extending through the tunnel and being spaced from the walls thereof and supported therein for free transverse movement in said tunnel; resilient means supporting said conduit in said tunnel; and an open passageway connecting the interior of the tunnel with the body of water to fill said tunnel with water and establish natural hydrostatic pressure in the tunnel around the conduit; said conduit being closed against fluid communication between the water in said tunnel and the inside of said conduit.

References Cited in the file of this patent

UNITED STATES PATENTS

| | | |
|---|---|---|
| 326,544 | Case | Sept. 22, 1885 |
| 964,001 | Dissosway | July 12, 1910 |
| 1,086,779 | Miller | Feb. 10, 1914 |
| 1,861,436 | Collins | June 7, 1932 |
| 2,005,704 | Gottwald et al. | June 18, 1935 |
| 2,459,227 | Kerr | Jan. 18, 1949 |
| 2,947,147 | Johnson | Aug. 2, 1960 |
| 2,991,807 | Turner | July 11, 1961 |

FOREIGN PATENTS

| | | |
|---|---|---|
| 352,616 | Germany | Apr. 28, 1922 |
| 638,505 | France | Feb. 21, 1928 |
| 536,858 | Belgium | Apr. 15, 1955 |